United States Patent

Pfisterer et al.

(10) Patent No.: US 6,689,401 B1
(45) Date of Patent: *Feb. 10, 2004

(54) NON-ALCOHOLIC BEER

(75) Inventors: Egbert A. Pfisterer, Willowdale (CA); Robert McCaig, Mississauga (CA); James J. Fitzpatrick, Barrie (CA); Robert M. Graham, Melbourne (AU)

(73) Assignee: Molson Breweries, Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 908 days.

(21) Appl. No.: 08/955,717

(22) Filed: Oct. 22, 1997

Related U.S. Application Data

(63) Continuation of application No. 08/726,545, filed on Oct. 7, 1996, now abandoned, which is a continuation of application No. 08/110,843, filed on Aug. 24, 1993, now abandoned.

(30) Foreign Application Priority Data

Sep. 4, 1992 (CA) ............................................. 2077584

(51) Int. Cl.⁷ ............................................. C12C 11/00
(52) U.S. Cl. ......................................... 426/11; 426/592
(58) Field of Search ................................... 426/16, 592

(56) References Cited

U.S. PATENT DOCUMENTS 3,544,329 A * 12/1970 Helm et al. .................... 426/11
5,007,994 A * 4/1991 Snee .......................... 204/240
5,242,694 A * 9/1993 Reuther ....................... 426/16
5,346,706 A * 9/1994 Murray et al. ................ 426/11

FOREIGN PATENT DOCUMENTS

GB             11277     * of 1909

OTHER PUBLICATIONS

Malting and Brewing Science, vol. 2, J.E. Hough et al., $2^{nd}$ Ed., Chapman and Hall, New York, 1982.*

* cited by examiner

*Primary Examiner*—Curtis E Sherrer
(74) *Attorney, Agent, or Firm*—Anthony J. Casella; Gerald E. Hespos

(57) ABSTRACT

A method of brewing a malt beverage having a low alcohol content is disclosed. A malt and cereal infusion having an extract content below about 14% is prepared, and boiled to obtain a wort. A predetermined quantity of hops are then added to said wort, which is then aerated. The wort is pitched with a yeast slurry to provide a cell count of about 80 to about 180 million yeast cells per ml and fermented at a temperature of about 3° C. to about 10° C. for 1 to 40 hours. The yeast is then removed from the fermented wort, and the resulting brew is filtered, and electrolyzed with a copper electrode to remove $H_2S$. The alcohol concentration of the brew is then adjusted with carbonated water to a preselected level, and then the resultant brew is aged for at least 24 hours.

8 Claims, No Drawings

NON-ALCOHOLIC BEER

This application is a continuation, of application Ser. No. 08/726,545, filed Oct. 7, 1996, now abandoned, which is a continuation, of application Ser. No. 08/110,843, filed Aug. 24, 1993, now abandoned.

The present invention relates to the field of brewing more particularly, the present invention relates to a method for brewing a non-alcoholic beer. As used herein, and as generally accepted in the brewing industry, the term non-alcoholic beer refers to a brewed malt based beverage containing 0.5% or lower ethyl alcohol by volume.

The market niche occupied by non-alcoholic beers has traditionally been quite small, since throughout history and to the present, the presence of alcohol has been a natural and desirable characteristic of beer. The alcohol in beer is produced by fermenting wort with yeast. Wort is a solution produced by mashing ground barley malt, with or without additional fermentable foodstuffs such as corn or rice (known generally as adjuncts), in a large quantity of hot water, to extract sugars and other soluble substances such as low molecular proteins and polysacharides from the malt and adjuncts. Hops are added to the wort as it is boiled to provide the bitterness that is a characteristic of beers in general.

Traditionally, after a wort has been prepared, it is pitched with yeast and permitted to ferment, until the yeast has consumed all or substantially all of the fermentable extract in the wort. The major portion of fermentable carbohydrates will have been converted by the yeast into ethyl alcohol and carbon dioxide, and the flavour of the resultant beverage (after filtration and finishing) will be easily recognized as beer. This flavour is essentially a combination of three factors: the bitterness contributed by the hops, the distinct flavour of the unfermentable constituents from the barley malt which are not digested by the yeast, and aroma substances, generally considered fermentation by-products contributed by the yeast.

It will be understood, then, from the foregoing brief discussion, that two of the three things that go into the flavour of beer—malt and adjunct residues, and hop bitterness—are introduced during the wort making process, before any fermentation or ethyl alcohol production has occurred. Techniques have been developed, therefore, to bring the flavour components contributed by the yeast into beer without having the yeast consume the fermentable sugar in the wort and thereby produce alcohol. Such techniques are generally known as cold contact brewing, and are utilized in various forms for the brewing of non-alcoholic beer.

It will be understood, then, that the present invention relates, in general terms, to a cold contact brewing method.

In the present invention, to enhance the flavour of the beer, unwanted hydrogen sulphide is eliminated during brewing. This is one of the most common detractions from the taste of beer, and is a common sulphur based compound produced as an undesirable by-product of yeast metabolism during primary fermentation of beer. Hydrogen sulphide is usually present in finished beers at levels of 2 to 15 $\mu g/l$. However, levels above 5 $\mu g/l$ detract from the aroma and palette of the beer. Hydrogen sulphide levels follow the yeast budding index and thus rise and fall several times during fermentation; this makes control of this undesirable flavour compound difficult, particulary when fermentations have to be prematurely stopped in order to limit alcohol production. Therefore, a method has been incorporated for removing hydrogen sulphide from non-alcoholic beer production in the present invention and thereby improving the flavour of the finished beer.

Schur, in U.S. Pat. No. 4,661,355 describes a PROCESS FOR THE PREPARATION OF ALCOHOL-FREE DRINKS WITH A YEAST AROMA, which comprises contacting a prepared wort with a thick, alcohol-free yeast slurry harvested from a fermentation process, at a temperature below 3° C., preferably below 0° C. At these low temperatures, the yeast will not ferment the sugars in the wort, but after a time of 24 to 48 hours, a sufficient quantity of yeast aroma substances will have been released from the yeast to override wort taste. A drawback of the technique described by Schur is that it is difficult to maintain a near freezing temperature in the wort during the entire yeast contact period. As well, at such low temperatures the metabolic activity of yeast occurs at such a low rate that the amount of aroma substances released into the beer is not sufficient to overcome the worty taste. Also, at temperatures so nearly approaching freezing, ice formation is a significant problem.

A PROCESS FOR PREPARING A NON-ALCOHOLIC MALT BEVERAGE is disclosed by Huige et al in U.S. Pat. No. 4,970,082. In that patent, a combination of four essential process steps is described for brewing a non-alcoholic beverage. The steps described by Huige et al include: (i) producing a wort having a high (14–20%) extract concentration that includes fermentable sugars; (ii) obtaining a yeast slurry from a previous ordinary beer fermentation, the slurry containing from 10–20% yeast solids and the remainder beer; (iii) pitching wort with yeast slurry; and (iv) fermenting the pitched wort for 30 minutes to 10 hours at about 3° C. to about 7° C. The thereby obtained beverage has an alcoholic concentration of about 1% to 2%, but it is subsequently brought down to less than 0.5% by dilution with carbonated water. In the Huige et al process, great emphasis is placed on having little or no oxygen in the fermenter, to reduce aldehyde formation.

While the product of the Huige et al process is considered an acceptable non-alcoholic beverage, its flavour characteristics strongly reflect the make-up of its original ingredients. In particular, the Huige et al process states 14% as an essential minimum extract content in the wort which it utilizes. Moreover, of this 14%, a minimum of 40% is composed of corn syrup. Therefore, it will be understood that the yeast fermentation of Huige et al converts only a minimal percentage of fermentable extract to ethanol and $CO_2$ at the low temperature at which it is carried out. Accordingly, the resultant brew will have a fairly high sugar content, relative to fully fermented beer that exhibits little or no sugar (monomer or dimer) content.

In view of the foregoing, an object of the present invention is to provide a method of producing a non-alcoholic beverage having a true beer flavour. A further object of the present invention is to produce such a non-alcoholic beverage with less sweetness and worty taste than known non-alcoholic beers by adopting a novel cold fermentation scheme.

In one broad aspect, therefore, the present invention relates to a method of brewing a malt beverage having a low alcohol content, including the steps of: (a) preparing a malt and cereal infusion having an extract content below about 14%; (b) boiling said infusion to obtain a wort; (c) adding a predetermined quantity of hops to said wort; (d) aerating said wort; (e) pitching said wort with a yeast slurry to provide a cell count of about 80 to about 180 million yeast cells per ml; (f) fermenting the pitched wort at a temperature of about 3° C. to about 10° C. for 1 to 40 hours; (g) removing the yeast from the fermented wort; (h) filtering the resulting brew; (i) electrolyzing the resultant brew with a copper electrode to remove $H_2S$; and (j) adjusting the alcohol concentration of the brew with carbonated water to a preselected level, and then aging the resultant brew for at least 24 hours.

The present invention utilizes as a base a malt and cereal infusion, boiled to prepare a wort. In contradistinction to the Huige et al process, however, the wort of the present invention is prepared utilizing a significantly greater proportion of malt than of adjunct cereals. Typically a ratio of two-thirds malt, one-third corn syrup, by weight, is used to produce a wort containing a higher proportion of flavour constituents derived from malt. Moreover, in the process of the present invention, it is important that the total percentage, by weight, of the malt and cereal extract in the prepared wort to be kept below 14%. The applicant has determined that the extract concentration in excess of this level will result in a finished product, after fermentation, that will have a taste substantially contributed to by the presence of unfermented extract from the wort. At wort concentrations below 14% the amount of unfermented extract in the beer will be lower and thus contribute less of a worty taste to the final product.

After preparation and hopping (according to known hopping methods) of the wort, it is aerated with compressed air or oxygen. This is a significant departure from the prior art, which specifies that the wort be deoxygenated, or purged with carbon dioxide to ensure a dissolved oxygen free environment for the following fermentation. The reason given by Huige et al for deoxygenation of the wort is to provide a reducing environment conducive to allowing yeast to reduce aldehydes. However, the applicant has observed that it is more effective to focus on the elimination; of $H_2S$ during beer processing than providing a non-aerated wort at pitching. Accordingly, in the present invention, the wort is oxygenated to a level selected to secure yeast growth.

The aerated wort is then pitched with a yeast slurry harvested from a completed fermentation. The wort is pitched with a large quantity of yeast possessing a viability of at least 90% and a cell count of 80 to 180 million yeast cells per ml. The wort is then fermented at from 3° to 10° C. for 1 to 40 hours. The applicant has determined that a 6 hour fermentation at 6° C. is usually sufficient to provide in the brew an acceptable level of yeast flavour components, and to ferment a sufficient quantity of the fermentable sugars in the wort to reduce the sweetness of the brew to within acceptable levels.

After fermentation for the desired period of time, the yeast is quickly removed. It is essential that yeast removal be accomplished as efficaciously as possible, to prevent continued fermentation and to maintain product uniformity. Accordingly, it is preferred that the yeast be centrifuged from the partially fermented brew by a centrifuge that has been adapted to handle a high solids load in a short period of time. The beer is then chilled to 0° C., which precipitates out many colloidal substances such as proteins, and treated with a silica gel that functions as a flocculant to clarify the beer. The clarified beer is then acidified to a pH of below 4.3 using a food grade acid such as phosphoric acid, the selection of which will be a matter of choice for the skilled brewer. By bringing the pH of the partially fermented brew down from its naturally occurring pH of about 5.2, which is in the neutral range, to about 4.3, which is very mildly acidic, a more acceptable beer taste is obtained, closer to that of fully fermented beer.

At this point in the process of the present invention, the alcohol concentration will be significantly above the target level of 0.5%. Therefore, carbonated, deaerated water is then added to the brew, to bring the alcohol concentration to a level just above the target level. The brew is then aged at 0° C. for 24 hours minimum, and is filtered through a layer of course and fine grade kieselguhr to further clarify it and remove any haze particles after which carbonated deaerated water is added to adjust the alcohol content to the precise concentration desired.

The bitterness of the beer is then adjusted to produce a beverage that is well balanced in its flavour congeners. At this stage, any minor color changes desired may be made using, for instance, caramel.

As a final step in clarifying the beer and eliminating any unwanted taste components, the beer is electrolysed by a copper electrolysing unit. This unit gradually dissolves minute amounts of copper ions into the beer, to rid the beer of any hydrogen sulphide that may be present. This process is carried out in an electrolytic cell by passing beer between two electrolytically purified copper plate electrodes. The electrodes are housed in an insulated pipe such as, although not limited to, a polyvinylchloride pipe with an inner Teflon (polytetrafluoroethylene) coating to prevent leakage of the applied current through the housing during use. The beer is passed through this pipe on its way to the filter. The cell also contains a power supply capable of applying 24 D C with a continuous and repetitive reversing of polarity. The reversing polarity is controlled by a solid state repeat cycle timer. This continuous switching of polarity prevents the electrodes from excessive surface damage or coating while acting as a cathode, and allows for an equal disillusion of the electrode while acting as the anode. During this process, the sulphur of the hydrogen sulphide is precipitated out as copper sulphide, and the associated sulphur flavour is thereby eliminated.

The applicants have discovered that by electrolytically ridding the beer of $H_2S$, a substantial advantage is gained, and to a large extent, the cold fermentation process is made more practical than was previously the case. That is, a large quantity of viable yeast is required to be added to the wort for fermentation, and a natural by product of yeast growth is $H_2S$. Due to the presence of such a large quantity of yeast, $H_2S$ will tend to build up quite quickly in the fermenting brew, and will remain dissolved therein, because of the low temperature at which the fermenting brew is maintained.

The beer is then filtered one more time to remove any precipitant. The filtered beer is then carbonated to the desired level, bottled or canned and pasteurized.

It is to be understood that the examples described above are not meant to limit the scope of the present invention. It is expected that numerous variants will be obvious to the person skilled in the brewing art, without any departure from the spirit of the present invention. The appended claims, properly construed, form the only limitation upon the scope of the present invention.

We claim:

1. A method of brewing a malt beverage having a low alcohol content, including the steps of:
   (a) preparing a malt and cereal infusion having an extract content below about 14%;
   (b) boiling said infusion to make a wort;
   (c) adding a predetermined quantity of hops to said wort;
   (d) aerating said wort to secure yeast growth;
   (e) pitching said wort with a yeast slurry to provide a cell count of about 80 to about 180 million yeast cells per ml;
   (f) fermenting the pitched wort at a temperature of 3 to 10° C. for 1 to 40 hours;

(g) removing the yeast from the fermented wort;

(h) filtering the resulting brew;

(i) electrolyzing the resultant brew by passing said resultant brew past a pair of two copper electrodes to remove the $H_2S$; and (j) adjusting the alcohol concentration of the brew with carbonated water to a preselected level, and then aging the resultant brew for at least 24 hours.

2. A method as claimed in claim 1, including the further step of adjusting the pH of the fermented, filtered brew from about 5.2 to below about 4.3 by addition of a food grade acid.

3. A method as claimed in claim 2, wherein said fermentation is carried out at about 6° C. for about 6 hours.

4. A method as claimed in claim 3, wherein after yeast removal in step (g), the fermented brew is chilled to about 0° C. and before filtering is treated with silica gel to precipitate colloidal substances in the beer.

5. A method as claimed in claim 3, wherein said fermented, filtered brew is electrolyzed by passing said brew through a pipe equipped with a pair of copper electrodes connected to a source of electric current.

6. A method as claimed in claim 4 wherein the alcohol level of said brew is 0.5%.

7. A method as defined in claim 2 wherein the food grade acid is phosphoric acid.

8. A method of brewing a malt beverage having an alcohol content below 0.5%, said method consisting essentially of:

(a) preparing a malt and cereal infusion having an extract content below about 14%;

(b) boiling said infusion to make a wort;

(c) adding a predetermined quantity of hops to said wort;

(d) aerating said wort to an oxygen content which will secure yeast growth;

(e) pitching said wort with a yeast slurry to provide a cell count of about 80 to about 180 million yeast cells per ml;

(f) fermenting the pitched wort at a temperature of 3 to 10° C. for 1 to 40 hours;

(g) removing the yeast from the fermented wort and chilling the fermented brew to about 0° C. and treating the chilled fermented brew with silica gel;

(h) filtering the resulting brew and adjusting the pH of said filtered brew to a pH below about 4.3;

(i) electrolyzing the resultant brew by passing said resultant brew past a pair of two copper electrodes to remove the $H_2S$ using direct current while continuously and repetitively reversing the polarity of the current; and (j) adjusting the alcohol concentration of the brew with carbonated water to a preselected level, and then aging the resultant brew for at least 24 hours.

* * * * *